(12) United States Patent
Giles

(10) Patent No.: US 8,180,517 B2
(45) Date of Patent: May 15, 2012

(54) DIAGNOSTIC SYSTEM AND METHOD FOR PROCESSING CONTINUOUS AND INTERMITTENT FAULTS

(75) Inventor: Peter John Giles, Ypsilanti, MI (US)

(73) Assignee: GM Global Technology Operations LLC

( * ) Notice: Subject to any disclaimer, the term of this patent is extended or adjusted under 35 U.S.C. 154(b) by 240 days.

(21) Appl. No.: 12/698,436

(22) Filed: Feb. 2, 2010

(65) Prior Publication Data

US 2011/0190973 A1 Aug. 4, 2011

(51) Int. Cl.
*G01M 17/00* (2006.01)
(52) U.S. Cl. ...................................... 701/29.1
(58) Field of Classification Search ............. 701/36, 701/39, 42–44, 29.1, 29.2, 29.9, 31.3, 32.1, 701/34.4
See application file for complete search history.

(56) References Cited

U.S. PATENT DOCUMENTS 6,192,302 B1 * 2/2001 Giles et al. ................... 701/29
2008/0235172 A1 * 9/2008 Rosenstein et al. .......... 706/46

* cited by examiner

*Primary Examiner* — Kim T Nguyen

(57) ABSTRACT

A diagnostic system diagnoses a device and includes fault declaring module that selects one of a normal control mode, a temporary default action and a permanent default action. A counter module tracks a first number of successive test samples, a second number of failed samples that occur during the successive test samples, a third number of successive failed samples, a fourth number of failed samples, and a fifth number of samples since a last failed sample. The fault declaring module transitions to a temporary default action when at least one of the third number of successive failed samples is greater than a first value and the fourth number of failed samples is greater than a second value. The fault declaring module transitions to a permanent default action that is different than the temporary default action when the second number of failed samples is greater than a third value.

16 Claims, 3 Drawing Sheets

DIAGNOSTIC SYSTEM AND METHOD FOR PROCESSING CONTINUOUS AND INTERMITTENT FAULTS

FIELD

The present disclosure relates to diagnostic systems and methods, and more particularly to diagnostic systems and methods for electrical, electro-mechanical, hydraulic, and pneumatic devices used in vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicle control systems such as engine and transmission control systems use electrical, electro-mechanical, hydraulic and pneumatic devices to monitor operating conditions and to adjust operation. The speed of controlling the devices and the complexity of their operation has significantly increased. The vehicle control systems usually include diagnostic systems that determine whether the devices are functioning according to design. Demands on the diagnostic systems have increased as the vehicle control systems have become more complex.

The performance requirements of a particular output device or input signal for the vehicle control system may vary. For example, the diagnostic system may be required to detect and respond to an electrical fault of a first device or first input signal in less than 50 milliseconds to maintain control of the system. Other devices and/or input signals may allow diagnosis over longer or shorter intervals. The diagnostic system needs to detect and respond to a critical fault to correctly manage the failure mode to minimize damage and maximize safety.

Most diagnostic systems are designed to detect and respond to continuous faults that are present for predetermined time periods, for example 5 seconds or longer. The diagnostic systems set a Diagnostic Trouble Code (DTC) to inform the operator that a failure has occurred and that the vehicle requires service. When the DTC is set, the diagnostic system performs failure mode management to protect the system or subsystem. The action taken at the time the DTC is set is referred to as a permanent default action. The permanent default action is performed as long as the DTC is set.

Requiring the fault to be continuous and present for longer periods of time (for example only, 5 to 10 seconds) allows the diagnostic system to reduce false failures. A false failure occurs when the diagnostic system indicates a fault is present when no actual fault is present. Another type of false failure occurs when the diagnostic system sets a DTC too quickly and the vehicle is taken in for service the fault is no longer present. This condition is typically caused by a fault that is intermittent. These faults may significantly increase warranty costs and decrease customer satisfaction.

Vehicle control systems may be required to detect and respond to electrical faults that exist for very short periods of time to maintain control of a complex system. When these faults are detected, an appropriate failure mode management action may be performed. Therefore, diagnostic systems may be required to detect both continuous and intermittent faults. Intermittent faults can be short in duration, random, erratic, non-repeatable and/or repeatable.

Requiring detection and response to intermittent faults may increase false passes and/or false failures. False passes occur when the diagnostic system indicates no fault is present when a fault is actually present. False passes prevent failure mode management action by the diagnostic system. Therefore, accurate detection and response to various intermittent electrical faults will reduce false passes. Detecting random, short intermittent faults may also increase false failures.

SUMMARY

A diagnostic system for diagnosing a device in a vehicle control system during a plurality of diagnostic tests comprises a fault declaring module that selects one of a normal control mode, a temporary default action and a permanent default action for the vehicle based on the plurality of the diagnostic tests. A counter module tracks a first number of successive test samples, a second number of failed samples that occur during the successive test samples, a third number of successive failed samples, a fourth number of failed samples, and a fifth number of samples since a last failed sample. The fault declaring module transitions from the normal control mode to the temporary default action and takes a temporary default action when at least one of the third number of successive failed samples is greater than a first value and the fourth number of failed samples is greater than a second value. The fault declaring module transitions to a permanent default action and takes a permanent default action that is different than the temporary default action when the second number of failed samples is greater than a third value.

In other features, the fault declaring module transitions from the temporary default action to the normal control mode when the fifth number of samples is greater than a fourth value. A metric tracking module calculates metrics when the first number of successive test samples is greater than a fourth value.

In other features, the fault declaring module transitions from the permanent default action to the normal control mode when the first number of successive test samples is greater than a fourth value, the second number of failed samples is less than a fifth value, and the third number of successive failed samples and the fourth number of failed samples are equal to zero. The metric tracking module generates a first metric that is based on a ratio of the number of failed samples and the third value.

In other features, the metric tracking module generates a second metric that is based on a number of times that the temporary default action is entered during a predetermined period. The metric tracking module generates a third metric that is based on an amount of time that the vehicle operates in the temporary default action during the predetermined period.

In other features, the metric tracking module generates a fourth metric that is based on a ratio of the fourth number of failed samples and the second value.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
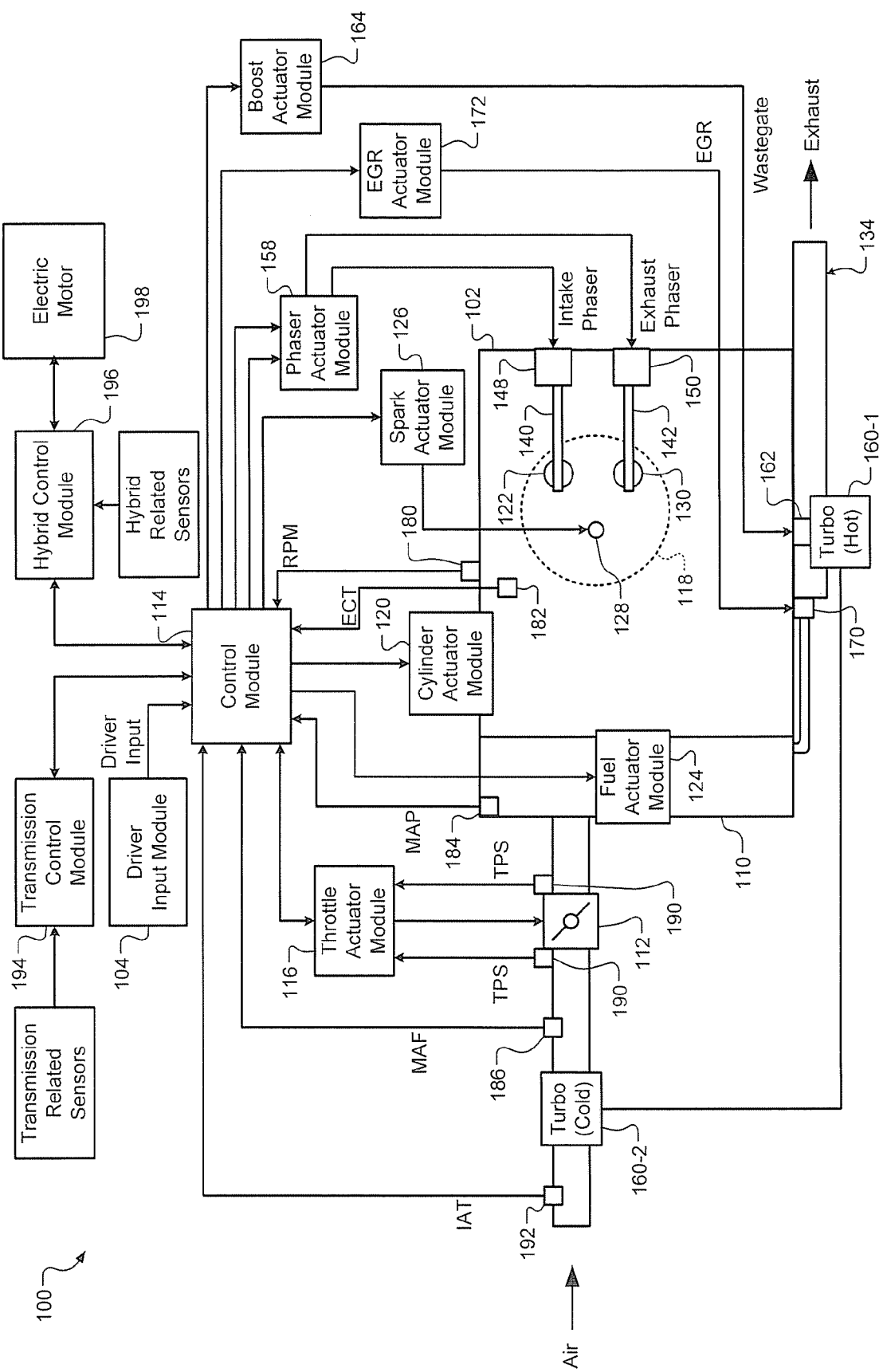
FIG. 1 is a functional block diagram of a vehicle control system including a control module according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable hardware components that provide the described functionality.

The diagnostic system and method according to the present disclosure may employ temporary default actions when an intermittent fault is detected. Temporary default actions may be similar to or different then permanent default actions that are used after a DTC is set. Typically, when the DTC is no longer present, the permanent default action is removed and the vehicle control system returns to normal mode. Temporary default actions are temporary failure mode management actions that enable the diagnostic system time to determine if the fault is a continuous hard fault or a repeatable intermittent fault that will mature to a DTC. If the intermittent fault was due to an anomaly of a short duration or simply a non-repeatable intermittent fault, the diagnostic system allows the control system to return to normal mode without setting a DTC.

The diagnostic system and method according to the present disclosure uses temporary default actions to allow further time for faults to mature before setting DTCs. If the fault persists, a DTC is set and a permanent default action may be taken. If the fault ends, the diagnostic system and method returns to a normal control mode. Metrics are stored and tracked for various parameters.

DTCs are only set when a minimum amount of test samples or time has elapsed and the ratio of fail samples to test samples approaches 100 percent. A DTC may also be set when a temporary default action occurs more than a predetermined number of times during a first predetermined period. For example only, the first predetermined period may be one key cycle. The DTC may also be set when the amount of time spent with a temporary default action exceeds a second predetermined period during the first predetermined period.

A common test may be provided for electrical circuits for fault conditions such as open circuit, short-to-ground or short-to-power faults. The diagnostic system and method identifies both continuous faults and intermittent faults of a particular duration and frequency. An increase in a predetermined fault time required to set a DTC is allowed by providing the temporary default action, which improves diagnostic precision.

The diagnostic system and method utilizes a ratio-based analysis for determining when an electronic component is declared operational or faulty. Both successive pass and fail samples are tracked. The diagnostic system and method also tracks intermittent faults that have a short duration but are repeatable within a specified time period.

Temporary default actions are used to provide additional time for the failure to continue to mature and/or demonstrate repeatability. This additional time increases the probability that the fault can be identified, isolated and repaired. This will reduce the number of situations where the service technician reports no trouble found (NTF). If the fault does not continue to repeat during the temporary default action, then the control system is allowed to return to the normal control mode.

The number of times the temporary default action is entered from the normal control mode in a predetermined period such as a power-up key cycle is tracked. A DTC is set when the number exceeds a predetermined number during the predetermined period. The diagnostic system and method uses a ratio based analysis or X out-of Y for determining when a DTC should be set due to a component fault and when the DTC should be cleared due to the absence of a fault.

The diagnostic system and method tracks the number of successive passed samples and successive failed samples at any point-in-time. Calibration parameters determine the number of successive failed samples that will be required to enter a temporary default action for a failure mode. Calibration parameters also determine the number of successive passed samples that will be required to exit the temporary default action and return to the normal control mode.

For purposes of illustration, the present disclosure will be described in the context of an exemplary vehicle control system for an internal combustion engine. As can be appreciated, the present disclosure has application to other types of control systems.

Referring now to FIG. 1, a functional block diagram of an exemplary engine system 100 is presented. The engine system 100 includes an engine 102 that combusts an air/fuel mixture to produce drive torque for a vehicle based on driver input from a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. Based on a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. In addition, the spark actuator module 126 may have the ability to vary the timing of the spark for a given firing event even when a change in the timing signal is received after the firing event immediately before the given firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the cylinder actuator module 120, the fuel actuator module 124, the phaser actuator module 158, the boost actuator module 164, and the EGR actuator module 172. For these actuators, the actuator values may correspond to number of activated cylinders, fueling rate, intake and exhaust cam phaser angles, boost pressure, and EGR valve opening area, respectively. The ECM 114 may control actuator values in order to cause the engine 102 to generate a desired engine output torque.

Figure 2:
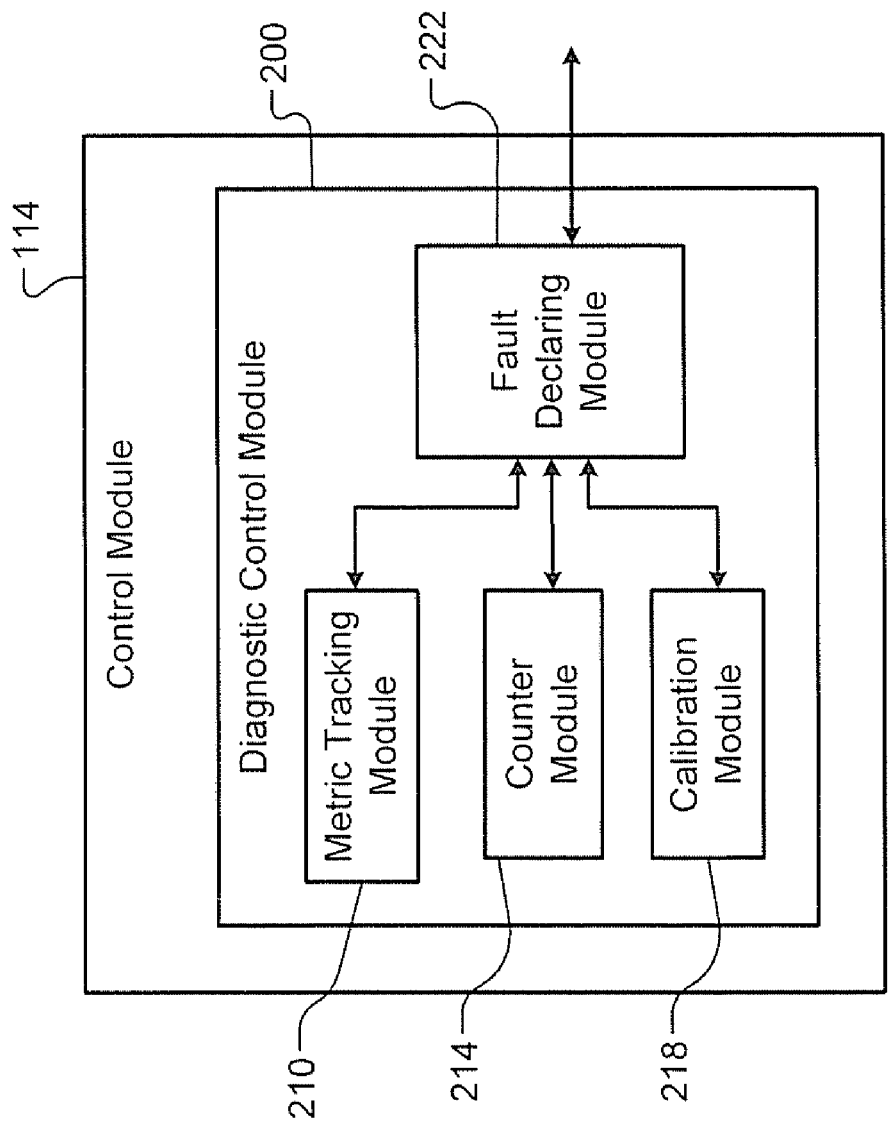
FIG. 2 is a more detailed functional block diagram of the control module according to the present disclosure.

Referring now to FIG. 2, the control module 114 includes a diagnostic control module 200. The diagnostic control module 200 performs tests on actuated devices and inputs of the vehicle control system. The diagnostic control module 200 includes a metric tracking module 210, which tracks metrics as will be described below. The diagnostic control module 200 further includes a counter module 214, which tracks various counter values as will be described further below. While counters are shown and described, timers may also be used to track elapsed time between events.

The diagnostic module 200 further includes a calibration module 218, which stores calibration values as will be described further below. A fault declaring module 222 communicates with the metric module 210, the counter module 214 and the calibration module 218 and selectively designates a normal control mode, a temporary default action and a permanent default action based on the metrics, counter values, timer values and/or calibration values. When in the temporary default action, the diagnostic module 200 may perform a first set of temporary default actions for a given device or input. The diagnostic module 200 may end the temporary default actions and return to the normal control mode under certain circumstances. When in the permanent default action, the diagnostic module 200 may perform a second set of permanent default actions for a given device, sensor or actuator that may be different than the first set of temporary default actions.

The timer/counter module 214 tracks various counter and/or timer values. As can be appreciated, timers and counters can be used interchangeably. PITTS refers to the Point-In-Time Successive Sampling of data. $X^{1CTR}$ tracks the number of fail samples accumulated during one sample set of Y samples (YSAMPLE_total). $X^{1CTR}$ is used to determine when to set or clear a DTC. $X^{2CTR}$ tracks the number of continuous or successive fail samples at any point-in-time—independent of the X of Y and referred to as PITSS—to determine when to enter a temporary default action (TDA). $X^{3CTR}$ tracks cumulative, non-continuous, or random failures (independent of the X of Y) that must occur within period defined by the Time-Since-Last-Fault ($TSLF^{CTR}$) and is used to determine when to enter a temporary default action (TDA). $Y^{1CTR}$ tracks the number of overall test samples or time in the sample set to determine whether a device is considered tested (YSAMPLE_total).

Time-Since-Last-Fault (TLSF) $TSLF^{CTR}$ tracks the number of continuous or successive pass samples or time at any point-in-time—independent of the X of Y and referred to as PITSS—to determine when to exit S2 or temporary default action (TDA) and return to S1 or normal control mode. TSLF is also used to determine when to clear or reset $X^{3CTR}$.

$TDA^{1CTR}$ tracks the number of times the temporary default action (TDA) was entered from the normal control mode during a predetermined period such as one power-up key cycle. $TDA^{2TMR}$ tracks the amount of time the control systems remains stuck in a temporary default action. This situation is caused by intermittent activity that is repeatable enough to remain in temporary default action and but unable to either set the DTC or exit the temporary default action.

$S^1$ refers to the normal control mode of the diagnostic control system. $S^2$ refers to the temporary default action. $S^3$ refers to a permanent default action.

The calibration module 218 stores various calibration values. YSAMPLE_total refers to the number of total test samples or total test time used to determine that a device is adequately tested to determine a pass or fail for setting or clearing a DTC. S2_ENTER_CONT_MX refers to the maximum number of successive or consecutive fail samples or time that will determine when to enter temporary default action. S2_ENTER_CONT_MX is determined by the criticality of the signal to the control system.

S2_ENTER_SUM_MX refers to the maximum number of random fail samples or time that indicates the accumulation or sum of the failures over a period of time that will determine when to enter temporary default action. This calibration is determined by the percent of X3_CLEAR_MN that would be considered detrimental to the control system. This would indicate how repeatable the failure is or the frequency of the failure.

S3_DTC_MX refers to the maximum number of fail samples or time of the total test samples or time to determine when to enter permanent default action and set the DTC—ratio of X of Y. S2_TDA_MX_CNT refers to the maximum number of transitions from normal control mode to temporary default action that would be allowed in one power-up key cycle before setting a DTC and taking permanent default action. S2_TDA_MX_TM refers to the maximum time that would be allowed to remain in a temporary default action during one power-up key cycle before setting a DTC and taking permanent default action. This scenario would be due to a fault that repeats but is either unable to set the DTC or exit temporary default action and return to normal control mode.

S2_EXIT_MN refers to the minimum number of successive or consecutive pass samples or time required to exit temporary default action and return to normal control mode. S2_EXIT_MN is typically a calibrated value that is longer than X3_CLEAR_MN. X3_CLEAR_MN refers to the minimum number of successive or consecutive pass samples or time that will determine when to reset or clear the tracking of cumulative failures by $X^{3CTR}$. TDA_ENABLED is set to 1 to utilize a temporary default action and set to 0 to use the standard X of Y test. S3_EXIT_MN refers to the minimum number of fail samples of the total test samples (ratio of X of Y) allowed to exit permanent default action and clear the DTC.

The metric tracking module 210 tracks metrics and stores a largest value. Metric 1 corresponds to $X^{1CTR}/(S3\_DTC\_MX) \times 100$. Metric 2 corresponds to $TDA^{1CTR}$. Metric 3 corresponds to $TDA^{2TMR}$. Metric 4 corresponds to $X^{3CTR}/(S2\_ENTER\_SUM\_MX) \times 100$.

Figure 3:
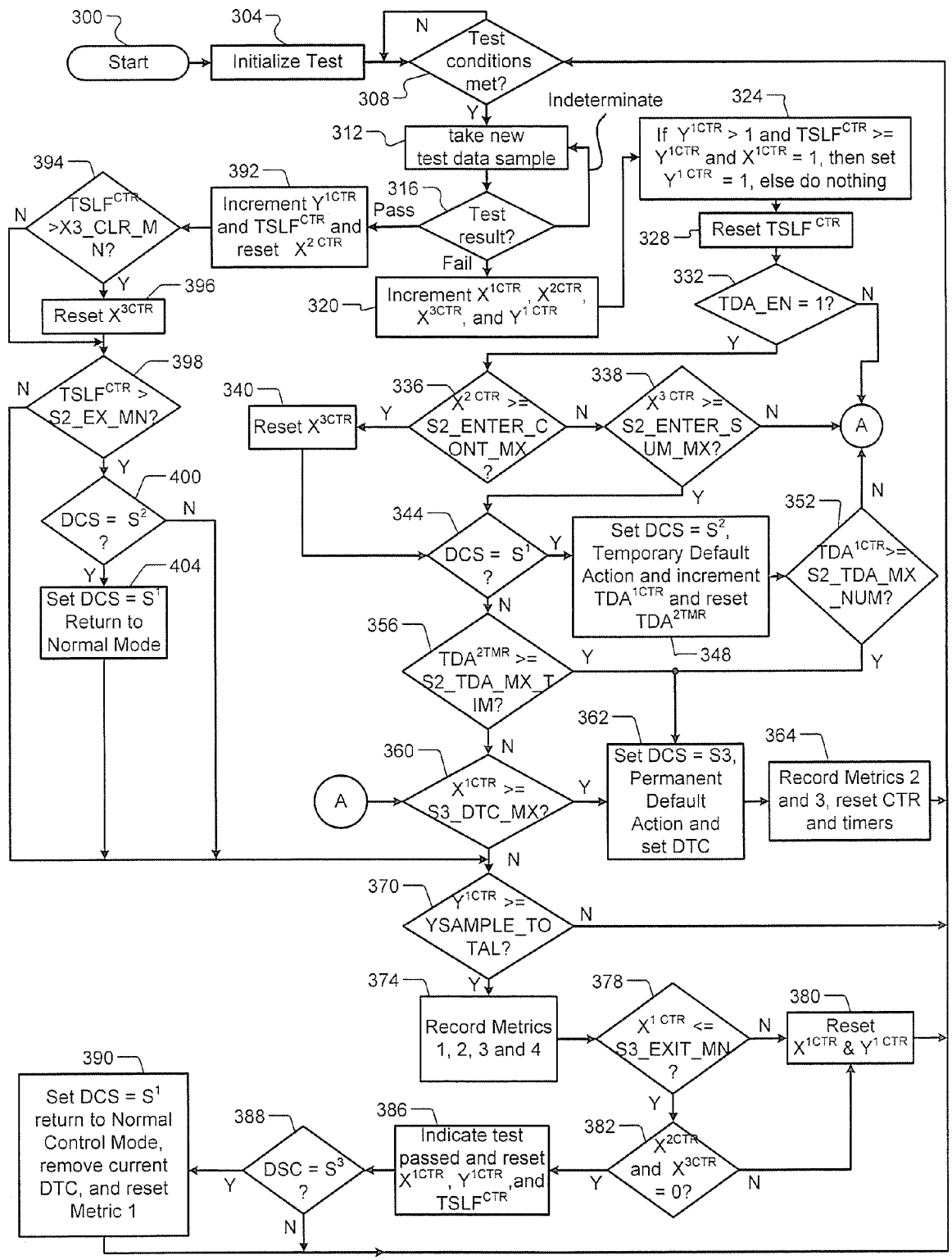
FIG. 3 illustrates a method for diagnosing faults.

Referring now to FIG. 3, a method for diagnosing faults is shown. Control begins at 300. At 304, the test is initialized. At 308, control determines whether test enable and entry conditions are met. At 312, control takes a new data sample. At 312, control determines a test result.

If the test result is indeterminate, control returns to 312. If the test result is a failure, control continues at 320 and increments counters $X^{1CTR}$, $X^{2CTR}$, $X^{3CTR}$, and $Y^{1CTR}$. At 324, control performs the following: if $Y^{1CTR}=1$ and $TSLF^{CTR}>=Y1CTR$ and $X^{1CTR}=1$, then control sets $Y^{1CTR}=1$, else control does nothing. In step 328, control resets $TLSF^{CTR}$. At 332, control determines whether TDA_EN is equal to 1. If step 332 is false, control continues with step 360. If step 332 is true, control continues at 336.

At 336, control determines whether $X^{2CTR}$ S2_ENTER_CONT_MX. If 336 is true, control resets $X^{3CTR}$ at 340 and continues with 344. If 336 is false, control continues at 338 and determines whether $X^{3CTR}>=S2\_ENTER\_SUM\_MX$. If 338 is false, control continues with 360. If 338 is true, control continues at 344. At 344, control determines if DCS is $S^1$. If 344 is true, control sets $DCS=S^2$, takes temporary default action and increments $TDA^{1CTR}$ and resets $TDA^{2TMR}$. At 352, control determines whether $TDA^{1CTR}>=S2\_TDA\_MX\_NUM$. If 352 is false, control continues with 360. If 352 is true, control continues with 362.

If 344 is false, control continues with 356 and determines whether $TDA^{2TMR}>=S2\_TDA\_MX\_TIM$. If 356 is true, control continues with 362. If 356 is false, control continues at 360 where control determines $X^{1CTR}>=S3\_DTC\_MX$. If 360 is true, control continues with 362 and sets $DCS=S^3$, takes permanent default action and sets a DTC. At 364, control records Metrics 2 and 3 and resets counters and timers. Control returns to 308.

If 360 is false, control determines whether $Y^{1CTR}>=YSAMPLE\_total$. If 370 is false, control continues with 308. If 370 is true, control continues with 374 and records metrics 1, 2, 3 and 4. At 378, control determines whether $X^{1CTR}<=S3\_EXIT\_MN$.

If 378 is false, control resets $X^{1CTR}$ and $Y^{1CTR}$ at 380 and control returns to 308. If 378 is true, control determines whether $X^{1CTR}$ and $X^{3CTR}$ are equal to zero. If 382 is false, control continues with 380. If 382 is true, control indicates test passed and resets $X^{1CTR}$, $Y^{1CTR}$ and $TSLF^{CTR}$ at 386. Control continues with 388 and determines whether DSC is equal to S3. If 388 is true, control set DCS=S1, returns to normal control mode, removes the current DTC, and resets Metric 1 at 390. If 388 is false, control continues at 308.

If test result is a pass at 316, then control increments $Y^{1CTR}$ and $TSLF^{CTR}$ and resets $X^{2CTR}$ at 392. At 394, control determines whether $TSLF^{CTR}>X3\_CLR\_MN$. If true, control resets $X^{3CTR}$ at 396 and continues at 398. If 394 is false, control continues with 398. At 398, control determines whether $TSLF^{CTR}>S2\_EX\_MN$. If 398 is true, control continues at 400. At 400, control determines whether $DCS=S^2$. If 400 is true, control sets $DCS=S^1$ and returns to the normal mode at 404. Control continues from 398, 400 (when false) and 404 with 370.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A diagnostic system for diagnosing a device in a vehicle control system during a plurality of diagnostic tests, comprising:
   a fault declaring module that selects one of a normal control mode, a temporary default action mode and a permanent default action mode for the vehicle based on the plurality of the diagnostic tests; and
   a counter module that tracks a first number of successive test samples, a second number of failed samples that occur during the successive test samples, a third number of successive failed samples, a fourth number of accumulated failed samples, and a fifth number of samples since a last failed sample;
   wherein the fault declaring module:
      transitions from the normal control mode to the temporary default action mode and takes a temporary default action when at least one of the third number of successive failed samples is greater than a first value and the fourth number of accumulated failed samples is greater than a second value; and
      transitions to the permanent default action mode and takes a permanent default action that is different than the temporary default action when the second number of failed samples is greater than a third value.

2. The diagnostic system of claim 1, wherein the fault declaring module transitions from the temporary default action mode to the normal control mode when the fifth number of samples is greater than a fourth value.

3. The diagnostic system of claim 1, further comprising a metric tracking module that calculates metrics when the first number of successive test samples is greater than a fourth value.

4. The diagnostic system of claim 3, wherein the metric tracking module generates a first metric that is based on a ratio of the second number of failed samples and the third value.

5. The diagnostic system of claim 4, wherein the metric tracking module generates a second metric that is based on a number of times that the temporary default action mode is entered during a predetermined period.

6. The diagnostic system of claim 5, wherein the metric tracking module generates a third metric that is based on an amount of time that the vehicle operates in the temporary default action mode during the predetermined period.

7. The diagnostic system of claim 6, wherein the metric tracking module generates a fourth metric that is based on a ratio of the fourth number of accumulated failed samples and the second value.

8. The diagnostic system of claim 1, wherein the fault declaring module transitions from the permanent default action mode to the normal control mode when the first number of successive test samples is greater than a fourth value, the second number of failed samples is less than a fifth value, and the third number of successive failed samples and the fourth number of accumulated failed samples are equal to zero.

9. A method for diagnosing a device in a vehicle control system during a plurality of diagnostic tests, comprising:
   selecting one of a normal control mode, a temporary default action mode and a permanent default action mode for the vehicle based on the plurality of the diagnostic tests;
   using a diagnostic module, tracking a first number of successive test samples of the device, a second number of failed samples that occur during the successive test samples of the device, a third number of successive failed samples of the device, a fourth number of accumulated failed samples of the device, and a fifth number of samples since a last failed sample of the device;
   transitioning from the normal control mode of the vehicle to the temporary default action mode of the vehicle and taking a temporary default action when at least one of the third number of successive failed samples is greater than a first value and the fourth number of accumulated failed samples is greater than a second value; and
   transitioning to the permanent default action mode of the vehicle and taking a permanent default action that is different than the temporary default action when the second number of failed samples is greater than a third value.

10. The method of claim 9, further comprising transitioning from the temporary default action mode of the vehicle to the normal control mode of the vehicle when the fifth number of samples is greater than a fourth value.

11. The method of claim 9, further comprising calculating metrics when the first number of successive test samples is greater than a fourth value.

12. The method of claim 11, further comprising generating a first metric that is based on a ratio of the second number of failed samples and the third value.

13. The method of claim 12, further comprising generating a second metric that is based on a number of times that the temporary default action mode is entered during a predetermined period.

14. The method of claim 13, further comprising generating a third metric that is based on an amount of time that the vehicle operates in the temporary default action mode during the predetermined period.

15. The method of claim 14, further comprising generating a fourth metric that is based on a ratio of the fourth number of accumulated failed samples and the second value.

16. The method of claim 9, further comprising transitioning from the permanent default action mode of the vehicle to the normal control mode of the vehicle when the first number of successive test samples is greater than a fourth value, the second number of failed samples is less than a fifth value, and the third number of successive failed samples and the fourth number of accumulated failed samples are equal to zero.

* * * * *